(12) United States Patent
Chen et al.

(10) Patent No.: US 11,091,085 B2
(45) Date of Patent: Aug. 17, 2021

(54) MANUAL SAFETY TENSIONING DEVICE FOR AUTOMOBILE

(71) Applicant: Ningbo Xuli Metal Products Co., Ltd., Ningbo (CN)

(72) Inventors: Weiguo Chen, Ningbo (CN); Yanqiong Chen, Ningbo (CN); Wei Deng, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 0 days.

(21) Appl. No.: 16/959,053

(22) PCT Filed: Jan. 25, 2019

(86) PCT No.: PCT/CN2019/073065
§ 371 (c)(1),
(2) Date: Jun. 29, 2020

(87) PCT Pub. No.: WO2020/057037
PCT Pub. Date: Mar. 26, 2020

(65) Prior Publication Data
US 2020/0339029 A1    Oct. 29, 2020

(30) Foreign Application Priority Data

Sep. 18, 2018   (CN) .......................... 201811084077.6

(51) Int. Cl.
*B60P 7/08*    (2006.01)

(52) U.S. Cl.
CPC ........... *B60P 7/0823* (2013.01); *B60P 7/0846* (2013.01)

(58) Field of Classification Search
CPC ........ B60P 7/0846; B60P 7/0823; B60P 7/083
See application file for complete search history.

(56) References Cited

U.S. PATENT DOCUMENTS

| 3,884,450 A * | 5/1975 | Brammer ................ B60P 7/083 |
| | | 24/68 R |
| 7,861,382 B1 * | 1/2011 | Madachy .............. B60P 7/0846 |
| | | 24/68 CD |

* cited by examiner

Primary Examiner — Robert Sandy
(74) Attorney, Agent, or Firm — Wang Law Firm, Inc.

(57) ABSTRACT

A safety tensioning device for automobile has a main body, a winding mechanism and a first strap; wherein, the winding mechanism has a frame, a winding shaft and a winding wheel; the winding shaft runs through the two opposite walls of the frame, an inner end of the first strap is connected to the winding shaft; when the winding wheel rotates outward causes the winding shaft to rotate synchronously so that the first strap is wound inside the frame, and, when the winding wheel rotates inward causes the winding shaft to be locked to the frame, preventing the first strap from unwinding. The present invention has the following advantages, the winding wheel can be rotated inward or outward. In addition, the first strap passes through the device body and is limited on the band slot, so the strap can be prevented from being pulled out accidently.

10 Claims, 9 Drawing Sheets

MANUAL SAFETY TENSIONING DEVICE FOR AUTOMOBILE

CROSS-REFERENCE TO RELATED APPLICATIONS

This application is a national phase entrance of and claims benefit to PCT Application for a safety tensioning device for automobiles with manual winding function and an application thereof, PCT/CN2019/073065, filed on Jan. 25, 2019, which claims benefit to Chinese Patent Applications 201811084077.6, filed on Sep. 18, 2018. The specifications of both applications are incorporated here by this reference.

TECHNICAL FIELD OF THE INVENTION

The present invention relates to a safety tensioning device for automobiles, which is applied to various automobiles, trailers and motorcycles and can conveniently realize bundling and fixation of cargo.

BACKGROUND OF THE INVENTION

Conventional safety tensioning devices for automobiles generally consist of a device body, and short and long straps with hooks. The long strap and the device body are generally arranged separately. When in use, the free end of the long strap is passed into the device body and then the long strap is adjusted to an appropriate length. Then, the device body is manipulated to tightly wind the strap. The excessive strap will flies in the wind during transportation, resulting in traffic hazard. Or, the excessive strap is knotted and wound onto the device body or the tensioned strap. It is very unaesthetic.

To solve the problem, the applicant has applied for "TENSIONER WITH AUTOMATIC WINDING FUNCTION". Unlike the conventional tensioning devices, this tensioner has a function of automatically winding the strap. However, the tensioner has the disadvantages of complex structure and high cost. In addition, at present, some products also have a manual winding function. They are simple in structure. However, on one hand, the wound strap may become loose due to jolts during transportation, or even the wound strap may become completely loose and fly in the wind, resulting in traffic hazard. On the other hand, when a long strap is to be used, the strap may be completely pulled out from a winding shaft due to an operator's mistake. To wind the strap, the free end of the strap needs to be passed into the winding shaft again. It is complex to operate. In summary, it is necessary to further improve the existing safety tensioning devices for automobiles with a manual winding function.

SUMMARY OF THE INVENTION

A first technical problem to be solved by the present invention is to provide a safety tensioning device for automobiles with a manual winding function, which can wind a strap when a winding wheel is rotated outward and can lock the strap when the winding wheel is rotated inward.

A second technical problem to be solved by the present invention is to provide a safety tensioning device for automobiles with a manual winding function, which can prevent a strap from being pulled out accidently.

To solve the first technical problem, the present invention employs the following technical solutions. A safety tensioning device for automobile, comprising a main body, a winding mechanism and a first strap; wherein, the winding mechanism comprises a frame having two opposite walls, a winding shaft and a winding wheel; the winding shaft runs through the two opposite walls of the frame, the winding wheel is mounted on the shaft and disposed outside of the frame, and an inner end of the first strap is connected to the winding shaft; when the winding wheel rotates outward causes the winding shaft to rotate synchronously so that the first strap is wound onto the winding shaft and inside the frame, and, when the winding wheel rotates inward causes the winding shaft to be locked to the frame, thus preventing the first strap from unwinding.

Preferably, the main body and the winding mechanism are two separated components, and the main body and the winding mechanism are connected through a connecting shaft; and, the tensioning device further comprises a second strap having an inner end, the inner end of the second strap is connected to the connecting shaft. Of course, the main body and the winding mechanism may also be integrated.

Preferably, the winding shaft has a threaded end extending out of the frame, and the winding wheel is in threaded onto the threaded end.

To limit the forward or backward rotation of the winding wheel, a stopper is disposed on an end of the threaded end, the winding wheel is capable of resisted against the stopper when rotating outward, and the winding wheel is capable of resisted against the outer surface of the frame when rotating inward.

Various connecting structures may be used between the stopper and the threaded end. Preferably, the stopper is fixed to the threaded end through a screw.

To solve the second technical solution, the present invention employs the following technical solutions. A safety tensioning device for automobiles with a manual winding function is provided, wherein a band slot is formed on the winding shaft, and the first strap passes through the main body and is then fitted into the band slot.

Preferably, a plurality of elastic locking sheets are disposed at intervals inside the band slot arranged along a lengthwise direction of the band slot, and each elastic locking sheet has a toothed barb at the end of the elastic locking sheet. In this way, when running through the band slot, by the elastic locking sheets and the toothed barbs, the strap can move only in one direction and cannot move in the reverse direction. Thus, the strap is prevented from being accidentally pulled out.

Preferably, the first strap has a perforation portion at the inner end of the first strap, the perforation portion has a through hole arranged along the widthwise direction of the first strap; a fixed pin is passed through the through hole, the perforation portion is located at the outer side of the band slot; and, the outer diameter of the perforation portion is greater than the width of the band slot in the radial direction of the winding shaft. In this way, the strap can be prevented from being accidentally pulled out.

Preferably, the inner end of the first strap is directly fixed with the winding shaft. For example, the inner end of the first strap may be sewed on the winding shaft. Thus, the strap can be prevented from being accidentally pulled out.

Preferably, the main body part comprises a base, a handle disposed on the base and a transmission mechanism driven by the handle; the transmission mechanism comprises a main rotating shaft, the main rotating shaft is disposed on the outer side of the connecting shaft and is parallel to the connecting shaft, and, the first strap runs through the main rotating shaft to be connected to the winding shaft.

The transmission mechanism may be of various structures. Preferably, the transmission mechanism comprises the main rotating shaft, a ratchet wheel mounted on the main rotating shaft, and a driving pawl assembly and a locking pawl assembly both coordinated with the ratchet wheel; and, the driving pawl assembly and the locking pawl assembly are mounted on the handle and the base, respectively.

Compared with the prior art, the present invention has the following advantages. In the safety tensioning device for automobiles with a manual winding function, the winding shaft passes through the frame, the winding wheel is arranged on the outer side of the frame and connected to the winding shaft, and the winding wheel can be rotated inward or outward. When the winding wheel is rotated outward, the winding shaft can be driven to rotate synchronously, so that the first strap is wound in the frame; and, when the winding wheel is rotated inward, the frame can be locked to prevent from rotation, so that the wound strap is prevented from loosening. In addition, the first strap passes through the device body and is limited on the band slot, so the strap can be prevented from being pulled out accidently.

DETAILED DESCRIPTION OF THE EMBODIMENTS

Figure 1:
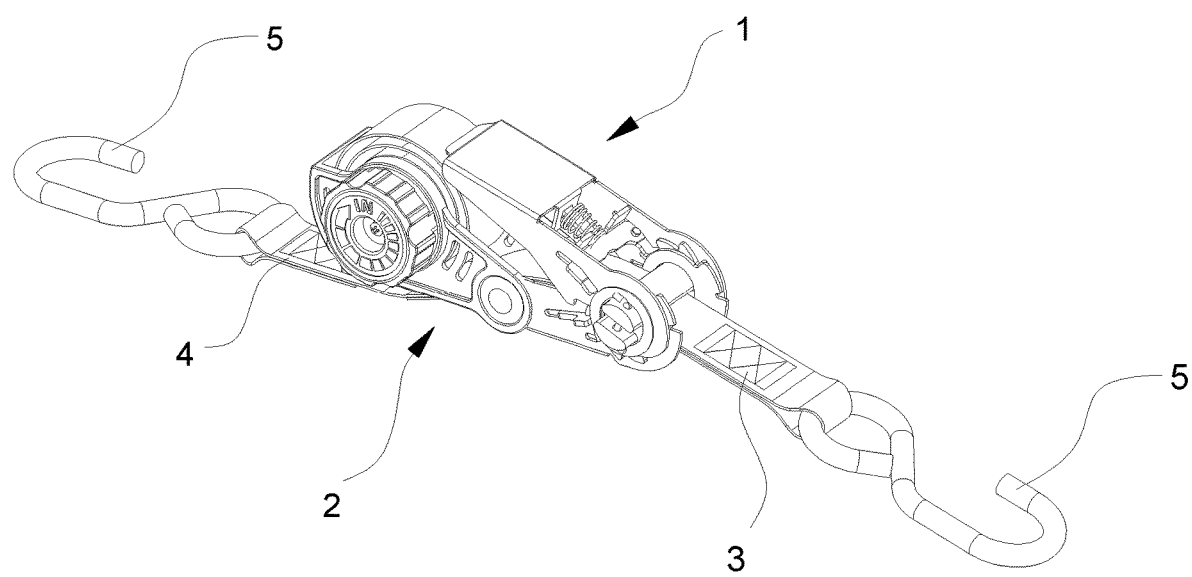
FIG. 1 is a perspective view according to Embodiment 1 of the present invention.
Figure 2:
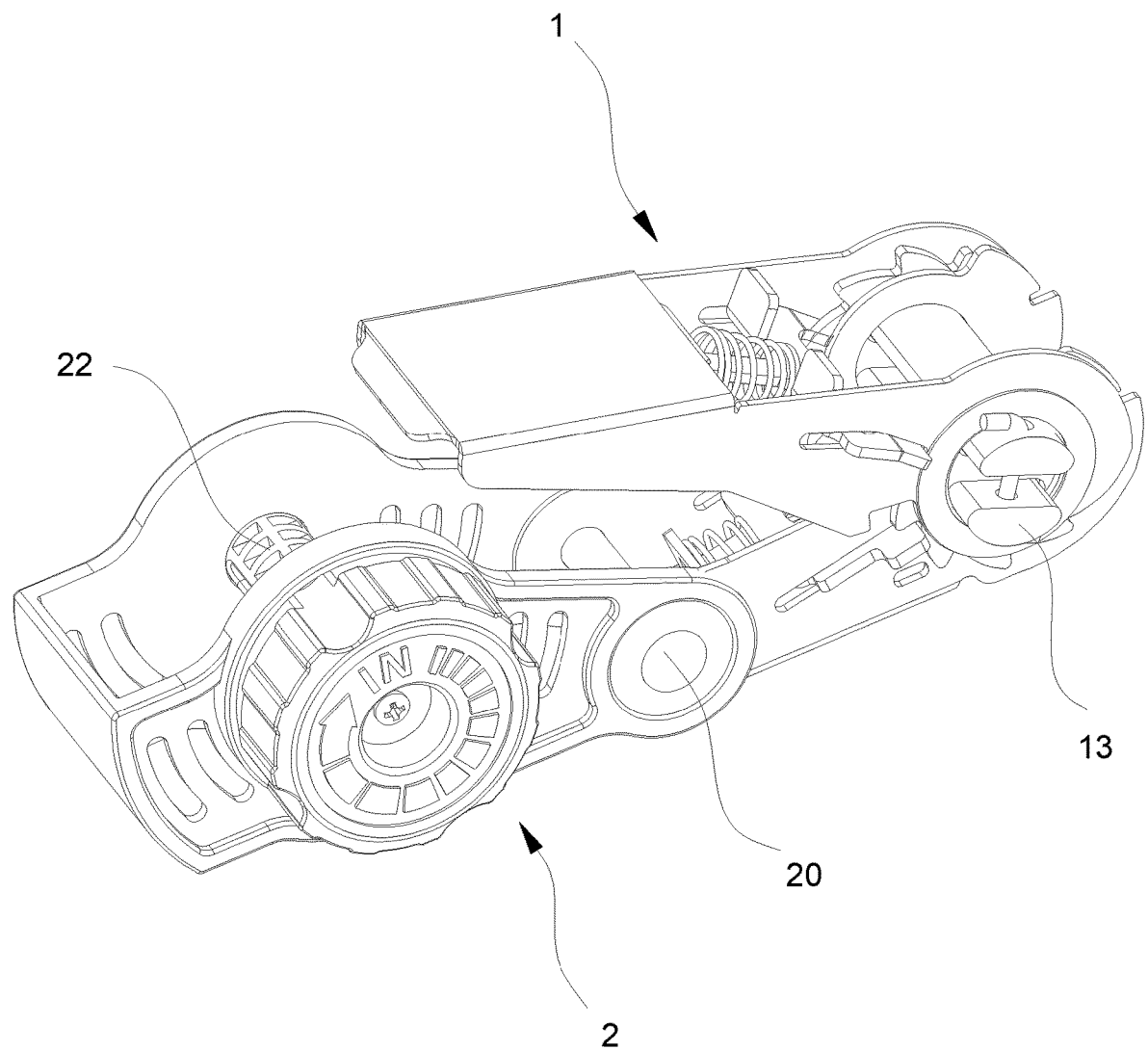
FIG. 2 is a perspective view of a main body and a winding mechanism according to Embodiment 1 of the present invention.
Figure 3:
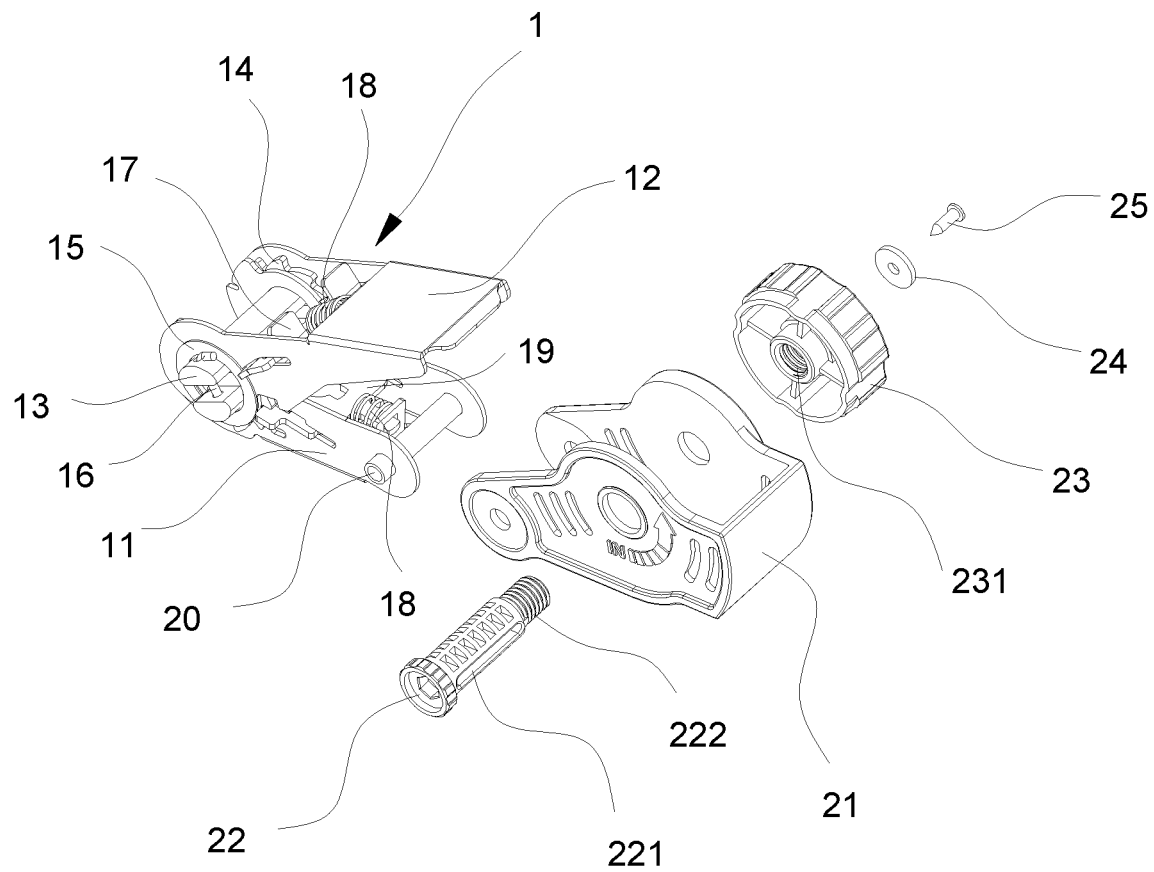
FIG. 3 is a perspective view of the main body and the winding mechanism according to Embodiment 1 of the present invention.
Figure 4:
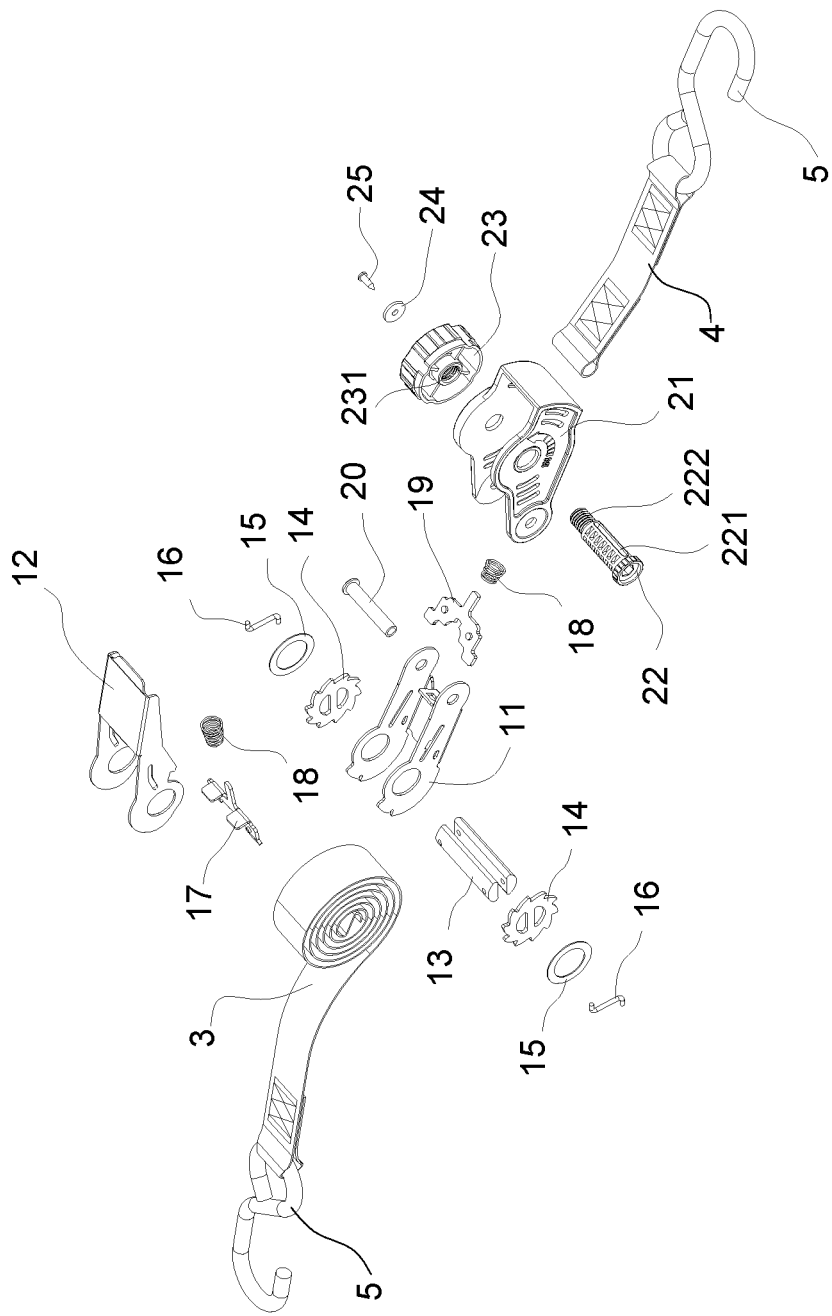
FIG. 4 is a perspective view according to Embodiment 1 of the present invention.
Figure 5:
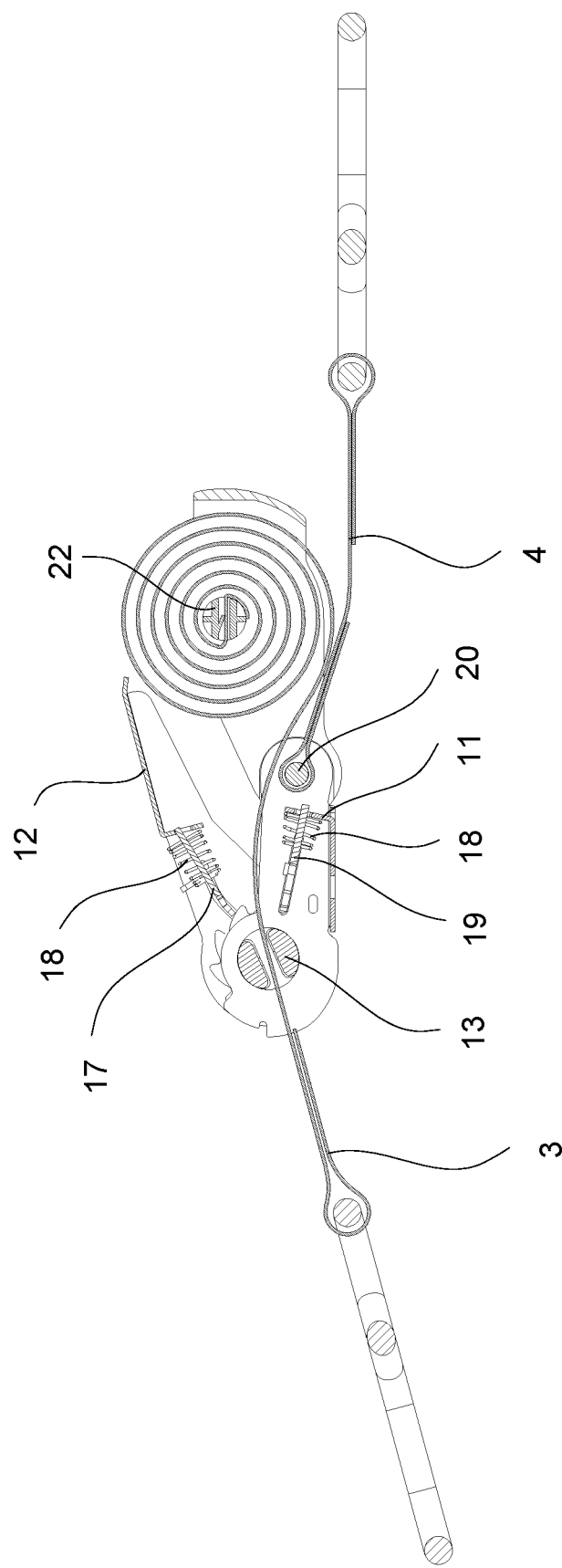
FIG. 5 is a sectional view according to Embodiment 1 of the present invention.
Figure 6:
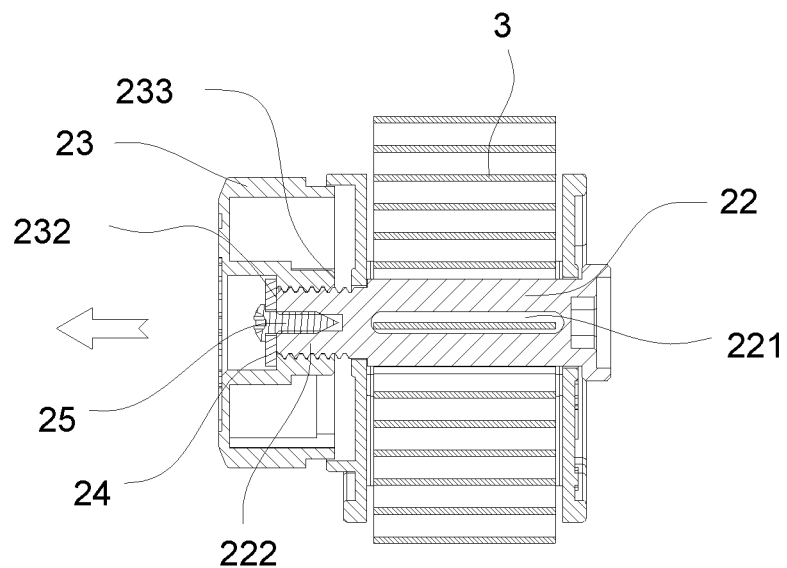
FIG. 6 is a sectional view in the wound state, according to Embodiment 1 of the present invention.
Figure 7:
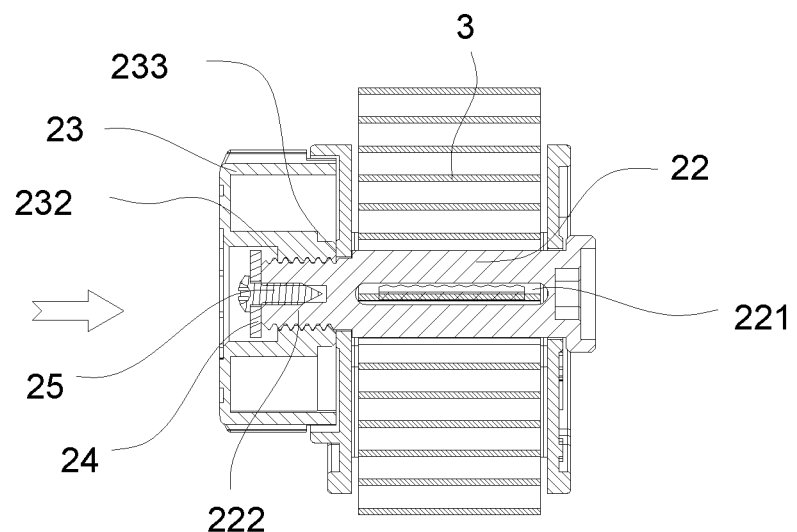
FIG. 7 is a sectional view in the locked state, according to Embodiment 1 of the present invention.

The present invention will be further described in detail by embodiments with reference to the accompanying drawings.

Embodiment 1

As shown in FIGS. 1-7, the safety tensioning device for automobiles with a manual winding function in this embodiment comprises a main body 1, a winding mechanism 2, a first strap 3 and a second strap 4. The main body 1 and the winding mechanism 2 are two separated components, and the main body 1 and the winding mechanism 2 are connected through a connecting shaft 20.

The main body 1 comprises a base 11, a handle 12 disposed on the base 11 and a transmission mechanism driven by the handle 12. The transmission mechanism comprises a main rotating shaft 13, a ratchet wheel 14, a driving pawl assembly and a locking pawl assembly. The ratchet wheel 14 is mounted on the main rotating shaft 13. The driving pawl assembly and the locking pawl assembly are coordinated with the ratchet wheel 14. The main rotating shaft 13 is disposed on the outer side of the connecting shaft 20 and is parallel to the connecting shaft 20. The driving pawl assembly and the locking pawl assembly are mounted on the handle 12 and the base 11, respectively. A spacer 15 and a pin 16 are mounted at the outer end of the main rotating shaft 13 to fix the ratchet wheel 14. The driving pawl assembly comprises a driving pawl 17 and a spring 18, and the locking pawl assembly comprises a locking pawl 19 and a spring 18. The structure of the main body 1 in this embodiment may be the same as the existing tensioning device and will not be repeated here.

The winding mechanism 2 comprises a frame 21 having two opposite walls, a winding shaft 22 and a winding wheel 23; the winding shaft 22 runs through the two opposite walls of the frame 21, the winding wheel 23 is mounted on the shaft and disposed outside of the frame 21. Hooks 5 are arranged at both the outer end of the first strap 3 and the outer end of the second strap 4. The first strap 3 is a long strap. The first strap 3 passes through the main rotating shaft 13, and an inner end of the first strap 3 is connected to the winding shaft 22. When the winding wheel 23 rotates outward causes the winding shaft 22 to rotate synchronously so that the first strap 3 is wound onto the winding shaft 22 and inside the frame 21, and, when the winding wheel 23 rotates inward causes the winding shaft 22 to be locked to the frame 21, thus preventing the first strap 3 from unwinding. The second strap 4 is a short strap, and the inner end of the second strap 4 is fixed to the connecting shaft 20.

The winding shaft 22 has a threaded end 222 extending out of the frame 21, and the winding wheel 23 is in threaded onto the threaded end 222. A stopper 24 is disposed on an end of the threaded end 222, and the stopper 24 is fixed to the threaded end 222 through a screw 25. The winding wheel 23 can be rotated inward or outward. The winding wheel 23 can be rotated outward to cause the winding shaft 22 to rotate synchronously so that the first strap 3 is wound onto the winding shaft 22 and inside the frame 21, until an outer end face 232 of the winding wheel 23 is resisted against the stopper 24. By the threads and the stopper 24, the winding wheel 23 drives the winding shaft 22 to rotate therewith so that the first strap 3 is wound onto the winding shaft 22 and inside the frame 21. The winding wheel 23 can be rotated inward. When an inner end face of the winding wheel 23 is resisted against the outer surface of the frame 21, the winding shaft 2 is locked and prevented from rotation, thus preventing the first strap 3 from unwinding.

Figure 8:
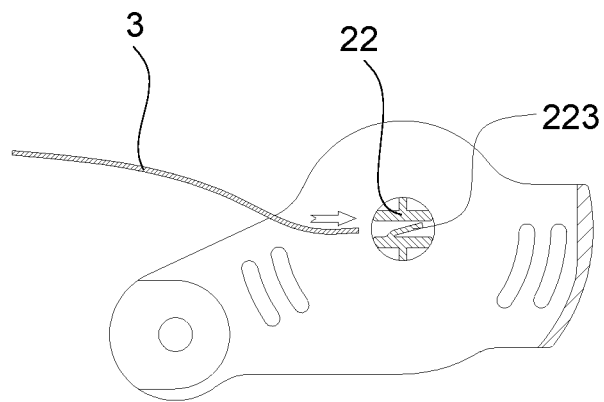
FIG. 8 is a sectional view before the passing of a strap, according to Embodiment 1 of the present invention.
Figure 9:
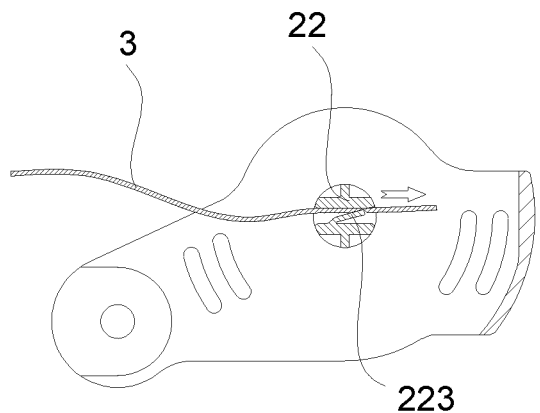
FIG. 9 is a sectional view after the passing of a strap, according to Embodiment 1 of the present invention.
Figure 10:
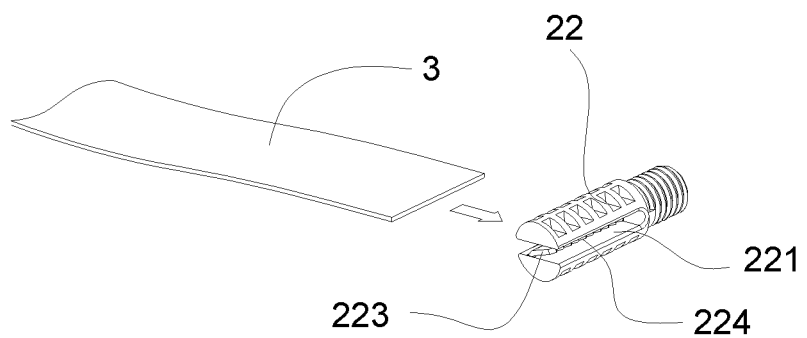
FIG. 10 is a perspective view before the passing of a strap, according to Embodiment 1 of the present invention.

As shown FIGS. 8-10, in this embodiment, a band slot 221 is formed on the winding shaft 22, and the first strap 3 passes through the main body 1 and is then fitted into the band slot 221. A plurality of elastic locking sheets 223 are disposed at intervals inside the band slot 221 arranged along a lengthwise direction of the band slot 221, and each elastic locking sheet 223 has a toothed barb 224 at the end of the elastic locking sheet 223. The toothed barbs 224 have a unidirectional locking function, and the first strap 3 is difficult to fall off after running through the band slot.

Embodiment 2

Figure 11:
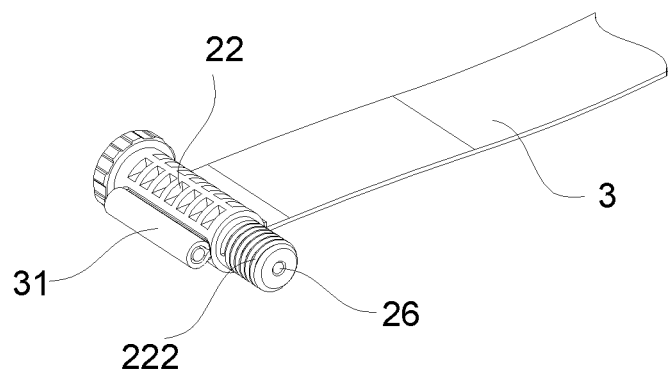
FIG. 11 is a perspective view according to Embodiment 2 of the present invention.
Figure 12:
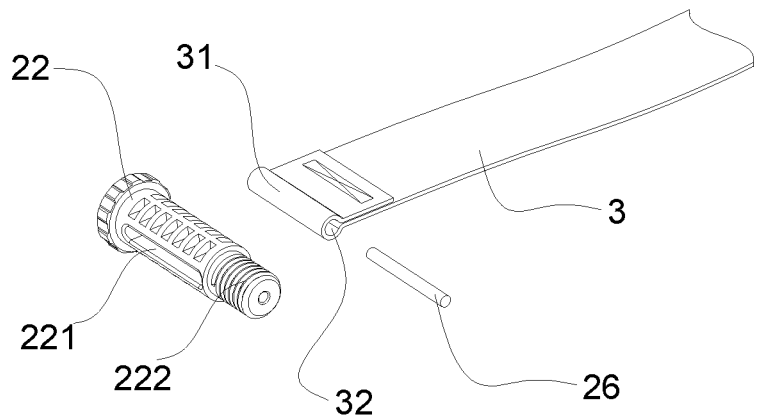
FIG. 12 is a perspective view according to Embodiment 2 of the present invention.
Figure 13:
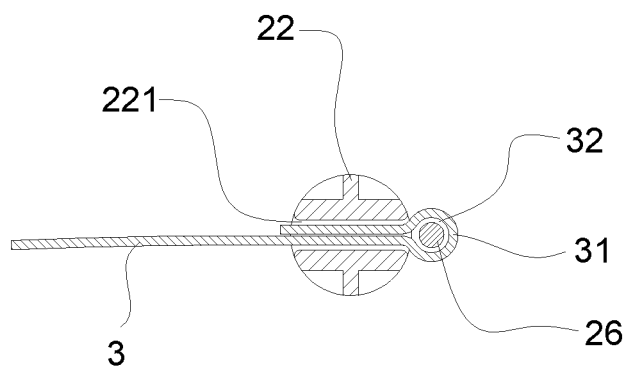
FIG. 13 is a sectional view according to Embodiment 2 of the present invention.

As shown in FIGS. 11-13, in this embodiment, the first strap 3 has a perforation portion 31 at the inner end of the first strap 3, the perforation portion 31 has a through hole 32 arranged along the widthwise direction of the first strap 3; a fixed pin 26 is passed through the through hole 32, the perforation portion 31 is located at the outer side of the band slot 221; and, the outer diameter of the perforation portion 31 is greater than the width of the band slot 221 in the radial direction of the winding shaft 22. In this way, due to the limiting effect of the perforation portion 31, the first strap 3 can be prevented from being accidentally pulled out. Other structures in this embodiment are the same as those in Embodiment 1, and will not be repeated here.

Embodiment 3

Figure 14:
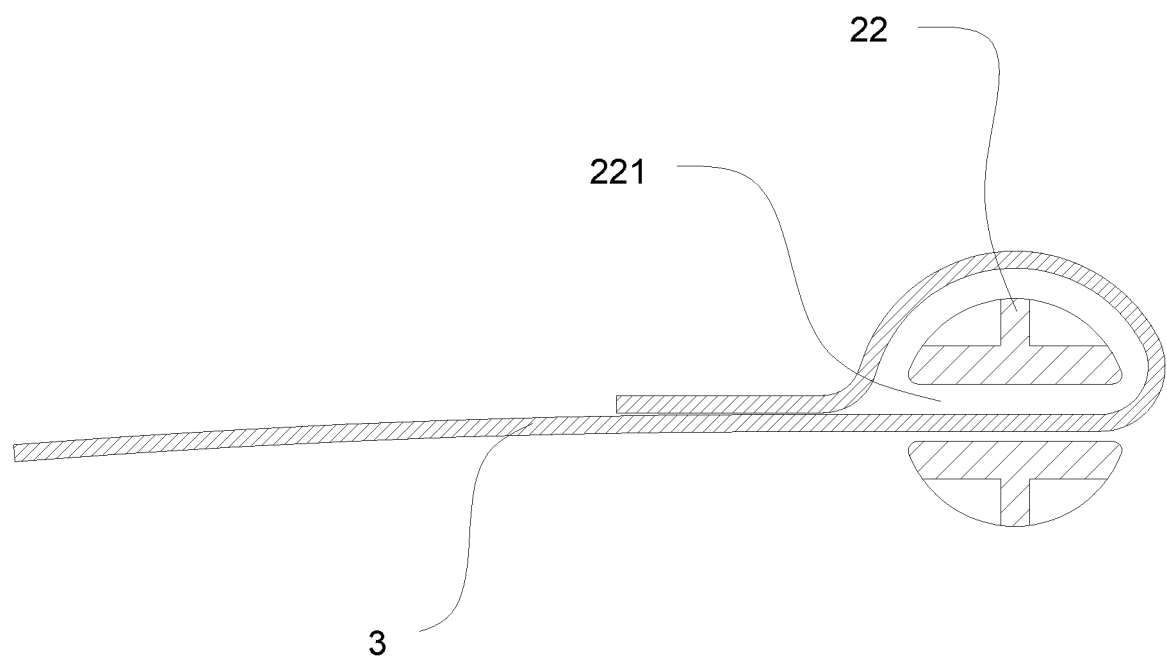
FIG. 14 is a sectional view according to Embodiment 3 of the present invention.

As shown in FIG. 14, in this embodiment, the inner end of the first strap 3 is directly fixed with the winding shaft 22. For example, the inner end of the first strap 3 may be sewed on the winding shaft 22. Thus, the first strap 3 can be prevented from being accidentally pulled out. Other structures in this embodiment are the same as those in Embodiment 1, and will not be repeated here.

The protection scope of the present invention is not limited to each embodiments described in this description. Any changes and replacements made on the basis of the scope of the present invention patent and of the description shall be included in the scope of the present invention patent. For example, the main body and the winding mechanism can be integrated, that is the base of the main body and the frame can be designed into a whole body.

What is claimed is:

1. A safety tensioning device for automobile, comprising: a main body, a winding mechanism and a first strap;
wherein, the winding mechanism comprises a frame having two opposite walls, a winding shaft and a winding wheel; the winding shaft runs through the two opposite walls of the frame, the winding wheel is mounted on the shaft and disposed outside of the frame, and an inner end of the first strap is connected to the winding shaft;
wherein the winding wheel rotates outward from the frame causing the winding shaft to rotate synchronously so that the first strap is wound onto the winding shaft and inside the frame, and the winding wheel rotates inward towards the frame causing the winding shaft to be locked to the frame, thus preventing the first strap from unwinding.

2. The safety tensioning device of claim 1, wherein the main body and the winding mechanism are two separated components, and the main body and the winding mechanism are connected through a connecting shaft;
and, the tensioning device further comprises a second strap having an inner end, the inner end of the second strap is connected to the connecting shaft.

3. The safety tensioning device of claim 1, wherein the winding shaft has a threaded end extending out of the frame, and the winding wheel is threaded onto the threaded end.

4. The safety tensioning device of claim 3, wherein a stopper is disposed on an end of the threaded end, the winding wheel is capable of being resisted against the stopper when rotating outward, and the winding wheel is capable of being resisted against the outer surface of the frame when rotating inward.

5. The safety tensioning device of claim 4, wherein the stopper is fixed to the threaded end through a screw.

6. The safety tensioning device of claim 1, wherein a band slot is formed on the winding shaft, and the first strap passes through the main body and is then fitted into the band slot.

7. The safety tensioning device of claim 6, wherein a plurality of elastic locking sheets are disposed at intervals inside the band slot arranged along a lengthwise direction of the band slot, and each elastic locking sheet has a toothed barb at the end of the elastic locking sheet.

8. The safety tensioning device of claim 6, wherein the first strap has a perforation portion at the inner end of the first strap, the perforation portion has a through hole arranged along the widthwise direction of the first strap;
a fixed pin is passed through the through hole, the perforation portion is located at the outer side of the band slot;
and, an outer diameter of the perforation portion is greater than a width of the band slot in the radial direction of the winding shaft.

9. The safety tensioning device of claim 6, wherein the inner end of the first strap is directly fixed with the winding shaft.

10. The safety tensioning device of claim 1, wherein the main body comprises a base, a handle disposed on the base and a transmission mechanism driven by the handle;
the transmission mechanism comprises a main rotating shaft, the main rotating shaft is disposed on the outer side of a connecting shaft and is parallel to the connecting shaft, and the first strap runs through the main rotating shaft to be connected to the winding shaft.

* * * * *